(12) United States Patent
Iwase et al.

(10) Patent No.: US 9,360,101 B2
(45) Date of Patent: Jun. 7, 2016

(54) POWER TRANSMISSION UNIT

(71) Applicant: Toyota Jidosha Kabushiki Kaisha, Toyota-shi Aichi (JP)

(72) Inventors: Yuji Iwase, Toyota Aichi (JP); Yosuke Suzuki, Seto Aichi (JP); Koichi Kato, Okazaki Aichi (JP); Kensei Hata, Okazaki Aichi (JP); Seitaro Nobuyasu, Okazaki Aichi (JP); Taro Moteki, Okazaki Aichi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/580,386

(22) Filed: Dec. 23, 2014

(65) Prior Publication Data

US 2015/0176694 A1    Jun. 25, 2015

(30) Foreign Application Priority Data

Dec. 25, 2013 (JP) ................................. 2013-266580

(51) Int. Cl.
| | |
|---|---|
| *F16H 61/00* | (2006.01) |
| *F16H 57/027* | (2012.01) |
| *F16H 3/72* | (2006.01) |
| *B60K 6/383* | (2007.10) |
| *B60K 6/40* | (2007.10) |
| *B60K 6/405* | (2007.10) |
| *B60K 6/445* | (2007.10) |
| *B60K 6/38* | (2007.10) |

(52) U.S. Cl.
CPC .............. *F16H 57/027* (2013.01); *B60K 6/383* (2013.01); *B60K 6/40* (2013.01); *B60K 6/405* (2013.01); *B60K 6/445* (2013.01); *F16H 3/721* (2013.01); *B60K 2006/381* (2013.01); *Y02T 10/6239* (2013.01)

(58) Field of Classification Search
None
See application file for complete search history.

(56) References Cited

U.S. PATENT DOCUMENTS

| | | | | |
|---|---|---|---|---|
| 3,461,993 A | * | 8/1969 | Brundage | F16D 25/02 192/104 F |
| 3,760,917 A | * | 9/1973 | Pagdin | F16D 27/004 192/84.31 |
| 4,351,203 A | * | 9/1982 | Fukunaga | F16H 57/027 137/540 |
| 4,506,562 A | * | 3/1985 | Yamaura | F16H 57/027 137/846 |
| 5,433,282 A | * | 7/1995 | Moroto | B60K 6/365 180/65.21 |
| 5,788,006 A | * | 8/1998 | Yamaguchi | B60K 6/365 180/65.235 |

(Continued)

FOREIGN PATENT DOCUMENTS

| | | |
|---|---|---|
| JP | 02-138234 U1 | 11/1990 |
| JP | 08-295140 A | 11/1996 |

(Continued)

*Primary Examiner* — Dirk Wright
(74) *Attorney, Agent, or Firm* — Dinsmore & Shohl LLP (57) ABSTRACT

A power transmission unit for preventing malfunction and deterioration in durability of a locking device arranged in a housing by preventing the ingress of foreign matters into the locking device. In the power transmission unit, a one-way brake 10 for selectively stopping a rotation of an output shaft 1a of an engine 1 is disposed between the housing 11 of a transmission mechanism and an engine block 1b. A fixed member 10a is fixed to the housing 11 or to the engine block 1b, and a movable member 10b is attached to the output shaft 1a. A through hole 21 is formed on the housing at a vertically lowest portion and axially outside of a region where the one-way brake 10 is situated, so as to provide a communication between an inner space and an outer space of the housing 11.

11 Claims, 5 Drawing Sheets

(56) References Cited

U.S. PATENT DOCUMENTS

| | | | | |
|---|---|---|---|---|
| 6,722,456 | B2* | 4/2004 | Hisada | B60K 6/445 180/65.235 |
| 8,480,522 | B2* | 7/2013 | Akutsu | B60K 6/26 180/65.225 |
| 2013/0017916 | A1* | 1/2013 | Sada | F16D 41/06 475/5 |
| 2015/0148171 | A1* | 5/2015 | Kim | B60K 6/36 475/5 |

FOREIGN PATENT DOCUMENTS

| | | |
|---|---|---|
| JP | H11-98615 A | 4/1999 |
| WO | 2013140527 A1 | 9/2013 |

\* cited by examiner

POWER TRANSMISSION UNIT

The present invention claims the benefit of Japanese Patent Application No. 2013-266580 filed on Dec. 25, 2013 with the Japanese Patent Office, the disclosure of which is incorporated herein by reference in its entirety.

BACKGROUND

1. Field of the Invention

The present invention relates to the art of a structure of a power transmission unit for automobiles.

2. Discussion of the Related Art

JP-A-8-295140 describes an example of the power transmission unit of a hybrid vehicle. The hybrid vehicle taught by JP-A-8-295140 is comprised of an engine, a generator/motor for generating electric power from input rotation, an electric motor driven by an electric current supplied thereto, a planetary gear unit, and a braking means. In the hybrid vehicle, an output shaft is connected to the electric motor to be rotated by the electric motor, a sun gear of the planetary gear unit is connected to the generator/motor, and a carrier of the planetary gear unit is connected to the engine. The braking means is adapted to stop rotations of the carrier and the engine.

According to the teachings of JP-A-8-295140, the engine is stopped and the electric motor is driven if a driving force required for driving the hybrid vehicle is larger than a set value. In this case, the braking means is actuated and the generator/motor is operated as a motor. Specifically, a one-way clutch is employed as the braking means, and the one-way clutch is disposed between an output shaft of the engine and a casing of a transmission holding the motors and the planetary gear unit. The one-way clutch becomes free when the engine rotates in its normal direction, and locks when the engine rotates in a reverse direction. Alternatively, a brake may also be used as the braking means in the hybrid vehicle taught by JP-A-8-295140 instead of the one-way clutch.

Thus, in the hybrid vehicle taught by JP-A-8-295140, the one-way clutch or the brake is disposed between the engine block and the casing of the transmission to serve as the braking means for locking a rotation of the engine. Basically, a clearance between the engine block and the housing of the transmission is not especially sealed. According to the conventional art, therefore, a through hole is formed on a lower portion of the housing of the transmission to drain water entering into the housing.

However, the through hole of the housing also allows entrance of water and dusts into the housing. Such foreign matter may further intrude into the braking means, and adhesion of the foreign matter to a movable portion of the braking means may cause a malfunction of the braking means and deterioration in durability of the braking means.

The present invention has been conceived noting the foregoing technical problems, and it is therefore an object of the present invention is to provide a power transmission unit for preventing the ingress of foreign matters into a locking device such as a one-way clutch and a brake in a housing, thereby preventing a malfunction of the locking device and deterioration in durability of the locking device.

SUMMARY OF THE INVENTION

The power transmission unit is comprised of a locking device disposed between a housing of a transmission mechanism and an engine block connected with the transmission mechanism. The locking device is comprised of a fixed member fixed to the housing or to the engine block, and a movable member attached to an output shaft of an engine. The locking device thus structured engages the movable member with the fixed member to stop a rotation of the output shaft. In order to achieve the above-explained objectives, according to the power transmission unit of the present invention, a through hole is formed on the housing at a vertically lowest portion and axially outside of a region where the locking device is situated, so as to provide a communication between an inner space and an outer space of the housing.

For example, a one-way brake can be used as the locking device. The one-way brake is disengaged to allow the output shaft to rotate in a forward direction, and engaged to stop a rotation of the output shaft when a torque is applied to the output shaft in a direction to rotate in a counter direction.

The fixed member is formed in a manner to have higher elasticity than that of other members of the locking device.

The fixed member is comprised of a buffer portion formed on at least a portion of the fixed member to enhance torsional elasticity higher than that of remaining portion.

The buffer portion may be formed by forming a hole on a portion of the fixed member to which a torsional load is applied.

The buffer portion may also be formed by forming a thinned portion on the portion of the fixed member to which a torsional load is applied.

For example, a dog brake adapted to engage the fixed member with the movable member by engaging engagement portions may be used as the locking device.

Alternatively, a friction brake adapted to engage the fixed member with the movable member by a friction force acting between contact faces may also be used as the locking device.

Thus, the power transmission unit of the present invention is provided with the locking device for selectively stopping a rotation of the output shaft of the engine, and the locking device is disposed between the housing of the transmission mechanism and the engine block. As described, according to the present invention, a through hole for discharging foreign matter such as water is formed on the housing at a lowest portion and axially outside of a region where the locking device is situated. Therefore, the locking device held in the housing can be prevented from an adhesion of the foreign matter such as water intruding from the through hole. For this reason, a malfunction of the locking device will not be caused by the foreign matter so that durability and reliability of the power transmission unit can be enhanced.

As also described, the one-way brake, the dog brake, and the friction brake may be used as the locking device. Given that the one-way brake is used as the locking device, elasticity of the fixed member can be enhanced to be higher than that of the other members of the one-way brake. In other words, rigidity of the fixed member can be reduced to allow the fixed member to be elastically deformed. Therefore, an impact torque caused by engaging the locking device and torque pulses can be absorbed by the fixed member whose elasticity is thus enhanced. That is, the impact torque and an excessive torque will not be applied to the locking device. For this reason, the locking device can be prevented from being damaged so that the durability and the reliability of the power transmission unit can be further enhanced.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
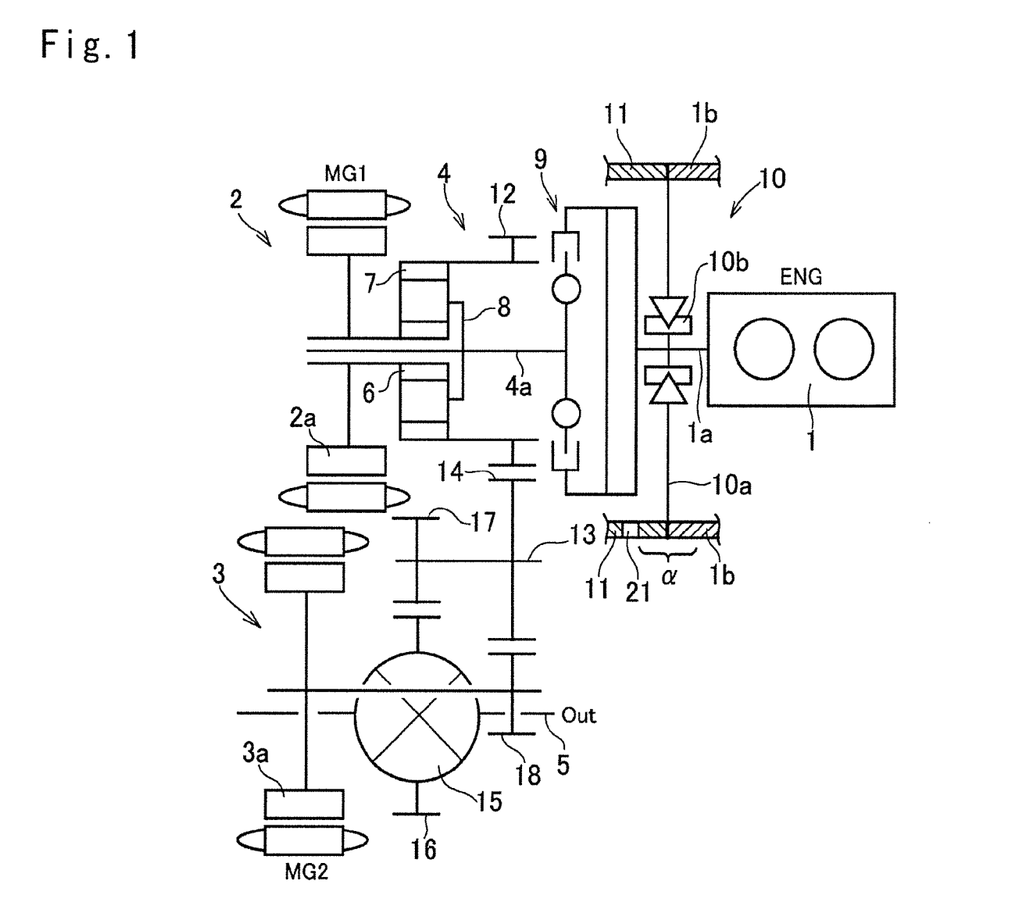
FIG. 1 is a view showing one example of the power transmission unit according to the present invention in which a one-way brake is used as the locking device.

Referring now to FIG. 1, there is shown a preferred example of the power transmission unit of a hybrid vehicle. A prime mover of the hybrid vehicle is comprised of an engine 1 (ENG), a first motor-generator 2 (MG1), and a second motor-generator 3 (MG2). A power of the engine 1 is distributed to the first motor-generator 2 side and to a driving wheel 5 side through a power distribution device 4. Meanwhile, an electric power generated by the first motor-generator 2 can be supplied to the second motor-generator 3 so that the second motor-generator 3 is driven to generate a power for rotating a drive shaft 5.

The engine 1 is allowed to be adjusted, started and stopped electrically. Specifically, given that a gasoline engine is used as the engine 1, an opening degree of a throttle valve, an amount of fuel supply, a commencement and a termination of ignition, an ignition timing etc. are controlled electrically.

In this preferred example, a permanent magnet type synchronous motor having a generating function is used individually as the first motor-generator 2 and the second motor-generator 3. Each of the first motor-generator 5 and the second motor-generator 3 is individually connected with a not shown battery through a not shown inverter to control a rotational speed and a torque thereof so that the motor-generators 2 and 3 can be operated selectively as a motor or a generator responsive to a current applied thereto.

Specifically, in the example shown in FIG. 1, the power distribution device 4 is a single pinion type planetary gear unit adapted to perform a differential action among three rotary element such as a sun gear 6, a ring gear 7 and a carrier 8.

The planetary gear unit serving as the power distribution device 4 is arranged coaxially with an output shaft 1a of the engine 1, and the first motor-generator 2 is situated on an opposite side of the engine 1 across the power distribution device 4. The sun gear 6 of the power distribution device 4 is connected with a rotor 2a of the first motor-generator 2, and the ring gear 7 as an internal gear is situated concentrically with the sun gear 6. A plurality of pinion gears are interposed between the sun gear 6 and the ring gear 7 while meshing with those gears, and those pinion gears are supported by the carrier 8 connected with an input shaft 4a of the power distribution device 4 in a rotatable and revolvable manner. The input shaft 4a is connected with the output shaft 1a of the engine 1 through a clutch 9 and a one-way brake 10.

The clutch 9 is arranged to connect and disconnect the engine 1 to/from a powertrain connecting the prime mover to the drive wheels. To this end, specifically, the clutch 9 connects the output shaft 1a of the engine 1 selectively with the carrier 8, and for example, a friction clutch adapted to frictionally connect rotary members may be used as the clutch 9.

The one-way brake 10 is disposed between an engine block 1b of the engine 1 and a housing 11 holding the one-way brake 10 and a transmission mechanism therein. Specifically, the transmission mechanism in the housing 11 is comprised of: the first and the second motor-generators 2 and 3; the power distribution device 4; the clutch 9; an after-mentioned gear train including a drive gear 12, a countershaft 13, a counter driven gear 14, and a counter drive gear 17; and at least part of a deferential gear unit 15. In addition, the engine block 1b is fixed to the housing 11 by a bolt or the like.

Specifically, the one-way brake 10 is disengaged to allow the output shaft 1a to rotate in a forward direction, and engaged to stop a rotation of the output shaft 1a when a torque is applied to the output shaft 1a in a direction to rotate in a counter direction. Here, a definition of "the forward direction" is a rotational direction of the engine 1 driven by burning fuel, and a definition of "the counter direction" is a rotational direction of the engine 1 opposite to the forward direction.

The one-way brake 10 is comprised of a fixed member 10a fixed to the housing 11 and the engine block 1b, and a movable member 10b attached to the output shaft 1a and the carrier 8. That is, the one-way brake 10 is adapted to selectively engage the fixed member 10a with the movable member 10b to serve as the locking device of the present invention. Father explanations about a structure and an arrangement of the one-way brake 10, a position of the housing 11 and etc. will be provided later.

Thus, the rotation of the output shaft 1a or the carrier 8 can be stopped by the one-way brake 10 depending on the direction of the torque applied thereto. Therefore, the engagement devices such as the clutch and the brake do not have to be especially controlled under EV mode where the vehicle is powered by the first motor-generator 2 and the second motor-generator 3.

The aforementioned drive gear 12 is an external gear that is formed around the ring gear 7 of the power distribution device 4 integrally therewith, and the countershaft 13 is arranged in parallel with a common rotational axis of the power distribution device 4 and the first motor-generator 2. The counter driven gear 14 is fitted onto one of the end portions of the countershaft 13 in a manner to be rotated therewith while being meshed with the drive gear 12. Meanwhile, the counter drive gear 17 is fitted onto the other end portion of the countershaft 13 in a manner to be rotated therewith while being meshed with a ring gear 16 of the deferential gear unit 15 serving as a final reduction. Thus, the ring gear 7 of the power distribution device 4 is connected with the drive shaft 5 through the gear train comprised of the drive gear 12, the countershaft 13, the counter driven gear 14, and the counter drive gear 17, and the deferential gear unit 15.

In the powertrain shown in FIG. 1, a torque of the second motor-generator 3 can be added to a torque transmitted from the power distribution device 4 to the drive shaft 5. To this end, the second motor-generator 3 is arranged in parallel with the countershaft 13, and a reduction gear 18 connected with a rotor 3a of the second motor-generator 3 is meshed with the counter driven gear 14. Here, a diameter of the reduction gear 18 is smaller than that of the counter driven gear 14 so that the torque generated by the second motor-generator 3 is transmitted to the counter driven gear 14 or to the countershaft 13 while being amplified.

Figure 2:
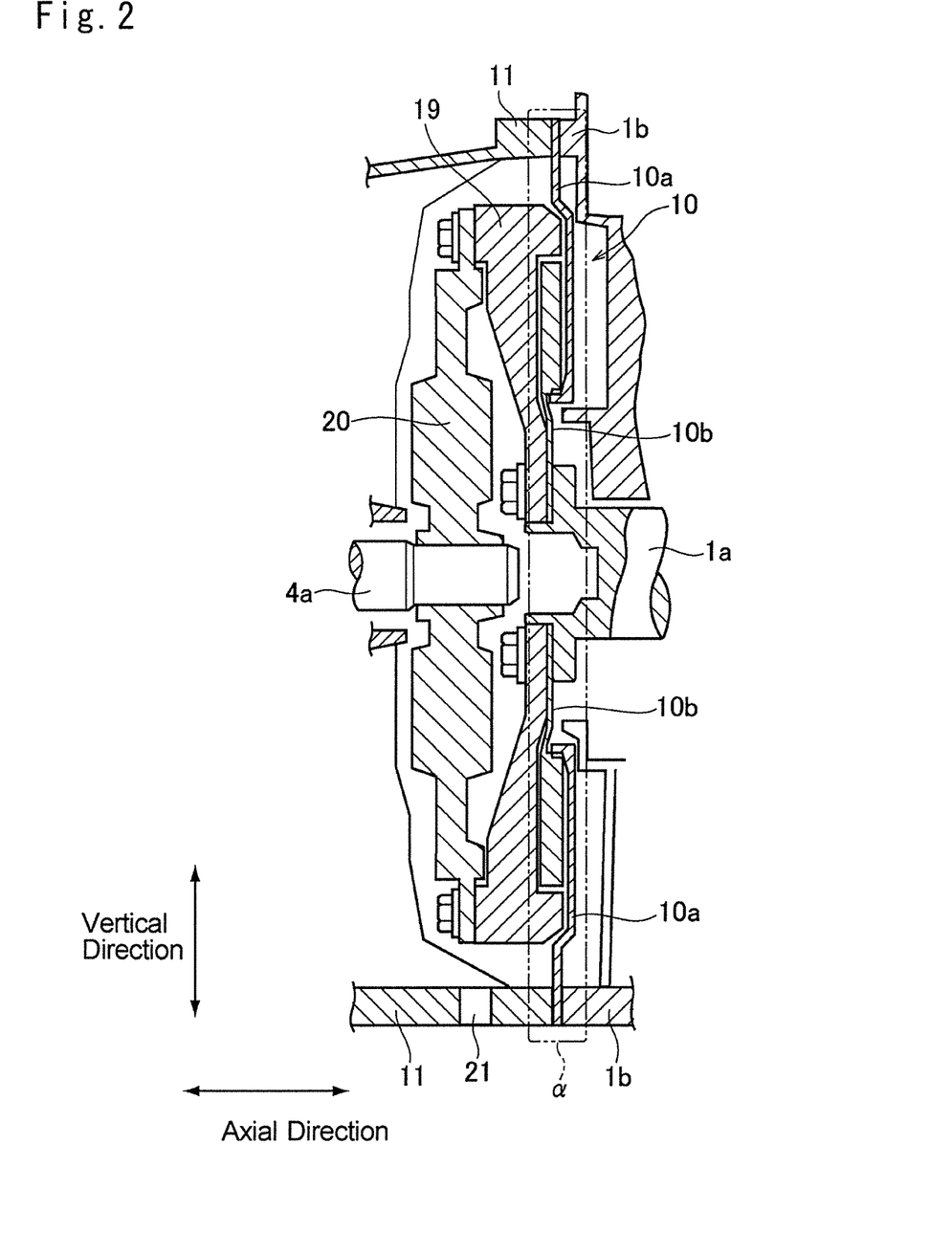
FIG. 2 is a cross-sectional view showing the example of the power transmission unit in which the one-way brake is used as the locking device.

FIG. 2 a cross-sectional view showing the structures and the arrangements of the one-way brake 10 and the housing 11 in more detail. As described, the one-way brake 10 is comprised of the fixed member 10a and the movable member 10b.

That is, the fixed member 10a and the movable member 10b of the one-way brake 10 form a ratchet type, a pole type, or a sprag type dry-clutch.

Figure 3:
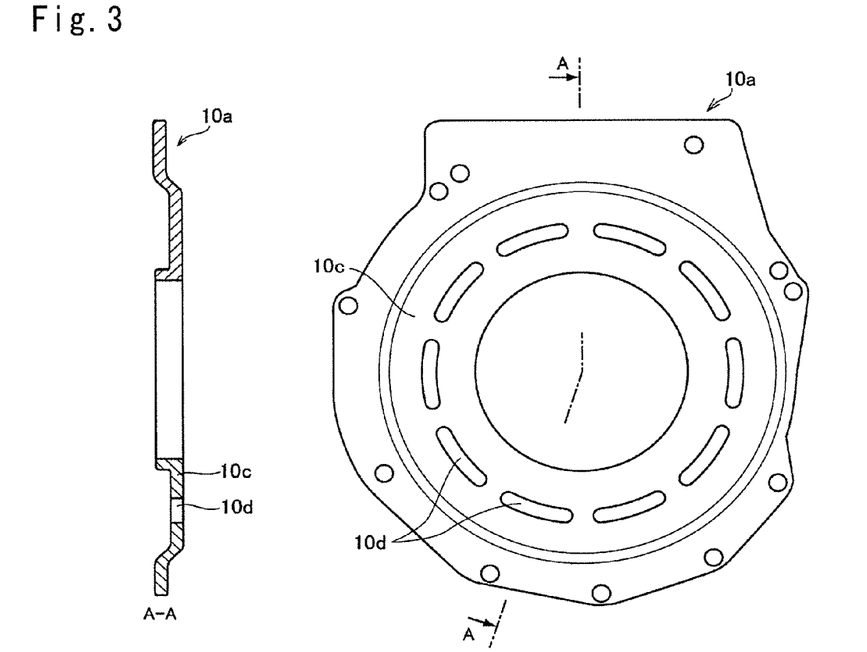
FIG. 3 is a view showing one example of a fixing member of the one-way brake shown in FIGS. 1 and 2.
Figure 4:
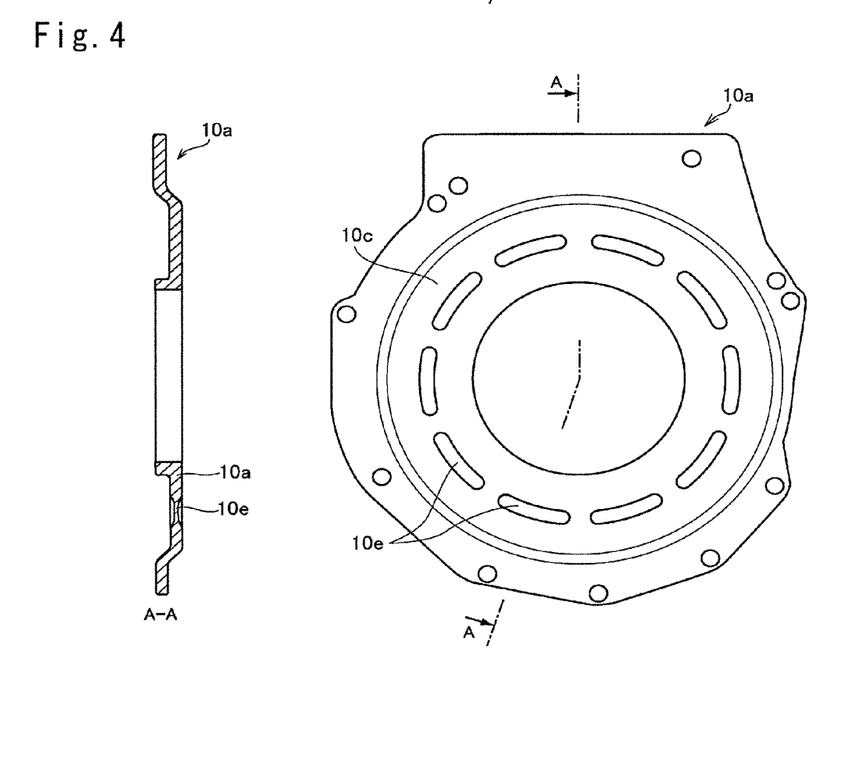
FIG. 4 is a view showing another example of the fixing member of the one-way brake shown in FIGS. 1 and 2.

As shown in FIGS. 3 and 4, the fixed member 10a is a disk plate member, and an outer circumferential edge of the fixed member 10a is clamped by the housing 11 and the engine block 1b to prevent rotation.

Meanwhile, the movable member 10b is attached to an outer circumferential portion of the output shaft 1a of the engine 1 together with a flywheel 19 by a bolt so as to rotate integrally with the output shaft 1a. The flywheel 19 is also attached to the input shaft 4a of the power distribution device 4 through a damper device 20 so as to rotate integrally with the input shaft 4a. As described, the input shaft 4a is connected with the carrier 8 of the power distribution device 4. Therefore, the movable member 10b is rotated integrally with the output shaft 1a and the carrier 8.

As also described, the one-way brake 10 is disposed between the housing 11 and the engine block 1b, and the clearance between the housing 11 and the engine block 1b is basically not sealed tightly. Therefore, in order to drain water entering into the housing 11, a through hole 21 is formed on the housing 11. Specifically, in order to provide a communication between an inner space and an outer space of the housing 11, the through hole 21 is formed on the vertically lowest portion of the housing 11 in FIG. 2 and axially outside of a region α where the one-way brake 10 is situated.

The through hole 21 thus formed on the housing 11 serves as a drainage hole for discharging the water and the dusts intruding into the housing 11 to the outer space of the housing 11. Therefore, the one-way brake 10 can be prevented from an adhesion of the intruding foreign matter to the actuating members such as the fixed member 10a and the movable member 10b. For this reason, a malfunction of the one-way brake 10 can be prevented.

According the preferred example, the fixed member 10a is formed to have higher elasticity than that of the other members of the one-way brake 10 so as to enhance durability and reliability. Therefore, the fixed member 10a is easily deformed elastically by a load applied thereto in comparison with the other members. In addition, the fixed member 10a is provided with a buffer portion to enhance torsional elasticity thereof to be higher than that of the remaining portion. Therefore, an impact torque caused by engaging the one-way brake 10 and torque pulses can be absorbed by the fixed member 10a. Thus, the impact torque and an excessive torque will not be applied to the one-way brake 10.

For example, the elasticity of the fixed member 10a can be enhanced by thinning a thickness while maintaining a required strength. Alternatively, the elasticity of the fixed member 10a can be enhanced by forming the fixed member 10a using material having high elasticity.

As shown in FIG. 3, for example, the buffer portion of the fixed member 10a may be formed by forming a plurality of holes 10d on a plate 10c in a circumferential direction. Alternatively, as shown in FIG. 4, the buffer portion of the fixed member 10a may also be formed by forming a plurality of thinned portions 10e on a plate 10c in a circumferential direction. The holes 10d or the thinned portions 10e reduce rigidity of the fixed member 10a while maintaining a required strength so that the fixed member 10a is allowed to be deformed easily in the rotational direction.

Figure 5:
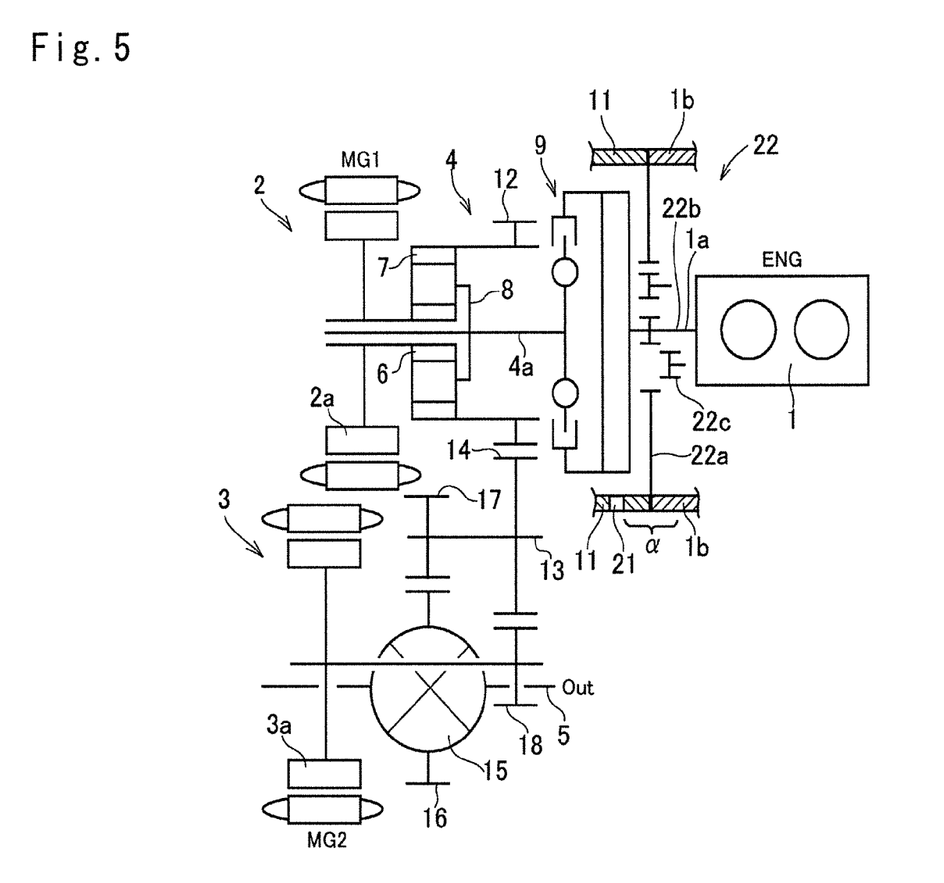
FIG. 5 a view showing an example of using a dog brake instead of the one-way brake in the power transmission unit shown in FIG. 1.

As shown in FIG. 5, a dog brake 22 may also be used as the locking device instead of the one-way brake 10 in the power transmission unit. According to the example shown in FIG. 5, the dog brake 22 is comprised of a fixed member 22a, a first movable member 22b, and a second movable member 22c.

Specifically, the fixed member 22a is clamped by the housing 11 and the engine block 1b to prevent rotation. Meanwhile, the first movable member 22b is fitted onto the output shaft 1a of the engine 1 to be rotated integrally therewith, and the second movable member 22c is splined to both of the fixed member 22a and the first movable member 22b while being allowed to slide in the axial direction. That is, the dog brake 22 is engaged and disengaged by sliding the second movable member 22c in the axial direction to selectively engage a spline key with a spline groove.

Thus, the dog brake 22 is also interposed between the housing 11 and the engine block 1b, and the through hole 21 is also formed on the vertically lowest portion of the housing 11 in FIG. 5 and axially outside of a region α where the dog brake 22 is situated.

According to the example shown in FIG. 5, therefore, the dog brake 22 can be prevented from an adhesion of the foreign matter such as water and dusts intruding from the through hole 21. For this reason, a malfunction of the dog brake 22 will not be caused by the foreign matter intruding into a clearance between the movable members 22b and 22c.

Figure 6:
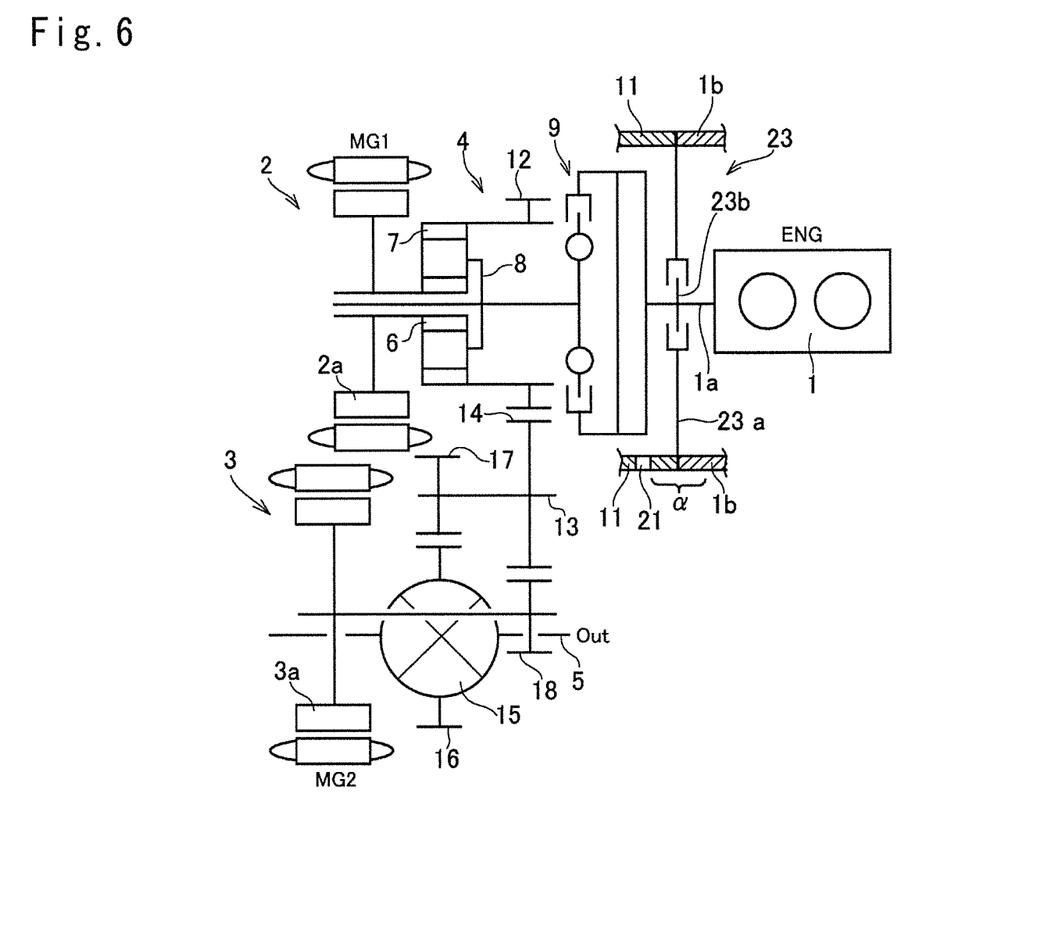
FIG. 6 a view showing an example of using a friction brake instead of the one-way brake in the power transmission unit shown in FIG. 1.

In addition, a friction brake 23 shown in FIG. 6 may also be used as the locking device. As shown in FIG. 6, the friction brake 23 is comprised of a fixed member 23a clamped by the housing 11 and the engine block 1b to prevent rotation, and a movable member 23b fitted onto the output shaft 1a of the engine 1 to be rotated integrally therewith. In addition, the movable member 23b is allowed to slide in the axial direction. That is, the friction brake 23 is engaged and disengaged by sliding the movable member 23b in the axial direction to selectively engage contact faces of the fixed member 23a and the movable member 23b by a friction force.

Thus, the friction brake 23 is also interposed between the housing 11 and the engine block 1b, and the through hole 21 is also formed on the vertically lowest portion of the housing 11 in FIG. 6 and axially outside of a region α where the friction brake 23 is situated.

According to the example shown in FIG. 6, therefore, the friction brake 23 can be prevented from an adhesion of the foreign matter such as water and dusts intruding from the through hole 21. For this reason, a malfunction of the friction brake 23 will not be caused by the foreign matter intruding into a clearance between the fixed member 23a and the movable member 23b.

What is claimed is:

1. A power transmission unit, comprising:
a locking device disposed between a housing of a transmission mechanism and an engine block connected with the transmission mechanism;
wherein the locking device is comprised of a fixed member fixed to the housing or to the engine block, and a movable member attached to an output shaft of an engine;
wherein the locking device adapted to selectively engage the movable member with the fixed member thereby stopping a rotation of the output shaft; and
a through hole that is formed on the housing at a vertically lowest portion and axially outside of a region where the locking device is situated, so as to provide a communication between an inner space and an outer space of the housing.

2. The power transmission unit as claimed in claim 1, wherein the locking device includes a one-way brake that is disengaged to allow the output shaft to rotate in a forward direction, and that is engaged to stop a rotation of the output shaft when a torque is applied to the output shaft in a direction to rotate in a counter direction.

3. The power transmission unit as claimed in claim 2, wherein the fixed member is formed to have higher elasticity than that of other members of the locking device.

4. The power transmission unit as claimed in claim 2, wherein the fixed member is comprised of a buffer portion formed on at least a portion of the fixed member to enhance torsional elasticity higher than that of remaining portion.

5. The power transmission unit as claimed in claim 4, wherein the buffer portion includes a hole that is formed on a portion of the fixed member to which a torsional load is applied.

6. The power transmission unit as claimed in claim 4, wherein the buffer portion includes a thinned portion that is formed on a portion of the fixed member to which a torsional load is applied.

7. The power transmission unit as claimed in claim 1, wherein the locking device includes a dog brake adapted to engage the fixed member with the movable member by engaging engagement portions.

8. The power transmission unit as claimed in claim 1, wherein the locking device includes a friction brake adapted to engage the fixed member with the movable member by a friction force acting between contact faces.

9. The power transmission unit as claimed in claim 3, wherein the fixed member is comprised of a buffer portion formed on at least a portion of the fixed member to enhance torsional elasticity higher than that of remaining portion.

10. The power transmission unit as claimed in claim 9, wherein the buffer portion includes a hole that is formed on a portion of the fixed member to which a torsional load is applied.

11. The power transmission unit as claimed in claim 9, wherein the buffer portion includes a thinned portion that is formed on a portion of the fixed member to which a torsional load is applied.

\* \* \* \* \*